United States Patent
Durrani et al.

(10) Patent No.: US 9,559,962 B2
(45) Date of Patent: Jan. 31, 2017

(54) OPTIMIZING TRAFFIC FLOWS VIA DYNAMIC ROUTING PROTOCOL MODIFICATIONS WHEN USING SERVER VIRTUALIZATION WITH DYNAMIC ROUTING

(71) Applicant: Brocade Communications Systems, Inc., San Jose, CA (US)

(72) Inventors: Muhammad Durrani, Sunnyvale, CA (US); Mukhtiar Shaikh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 253 days.

(21) Appl. No.: 14/047,325

(22) Filed: Oct. 7, 2013

(65) Prior Publication Data
US 2014/0204761 A1   Jul. 24, 2014

Related U.S. Application Data

(60) Provisional application No. 61/755,346, filed on Jan. 22, 2013, provisional application No. 61/755,350, (Continued)

(51) Int. Cl.
*H04L 12/803* (2013.01)
*H04L 12/891* (2013.01)
*H04L 12/713* (2013.01)

(52) U.S. Cl.
CPC .......... *H04L 47/125* (2013.01); *H04L 45/586* (2013.01); *H04L 47/41* (2013.01)

(58) Field of Classification Search
None
See application file for complete search history.

(56) References Cited

U.S. PATENT DOCUMENTS 6,779,039 B1   8/2004   Bommereddy et al.
8,238,250 B2 *   8/2012   Fung .............................. 370/237
(Continued)

FOREIGN PATENT DOCUMENTS

WO   2014116710 A2   7/2014

OTHER PUBLICATIONS

Bass Consulting Services, Inc. "OSPF Puppy. OSPF Network Types" Copyright: 2011.*
(Continued)

*Primary Examiner* — Jeffrey M Rutkowski
*Assistant Examiner* — Andre Tacdiran
(74) *Attorney, Agent, or Firm* — Fountainhead Law Group P.C.

(57) ABSTRACT

Techniques for optimizing traffic flows via dynamic routing protocol (DRP) modifications when server virtualization is used with dynamic routing are provided. In one embodiment, a network device can determine that it is part of a system of network devices acting as a virtual router. The network device can then transmit, to a client device, a DRP control packet that includes an interface IP address of the network device and a virtual IP address of the virtual router. In a further embodiment, the client device can receive the DRP control packet and store the interface IP address and the virtual IP address in a routing database. At the time of computing routing entries based on the routing database, the client device can replace, in entries that identify the interface IP address as the next hop, the interface IP address with the virtual IP address.

18 Claims, 14 Drawing Sheets

Related U.S. Application Data filed on Jan. 22, 2013, provisional application No. 61/770,745, filed on Feb. 28, 2013, provisional application No. 61/771,531, filed on Mar. 1, 2013, provisional application No. 61/799,039, filed on Mar. 15, 2013.

(56) References Cited

U.S. PATENT DOCUMENTS

| | | | |
|---|---|---|---|
| 8,243,594 | B1 | 8/2012 | Fotedar et al. |
| 8,705,526 | B1 | 4/2014 | Hasan |
| 8,787,149 | B1 | 7/2014 | Ramanathan et al. |
| 2003/0200315 | A1* | 10/2003 | Goldenberg et al. ......... 709/225 |
| 2005/0007951 | A1 | 1/2005 | Lapuh et al. |
| 2005/0083945 | A1* | 4/2005 | Singh et al. ............. 370/395.31 |
| 2006/0233168 | A1* | 10/2006 | Lewites ................ H04L 12/462 370/389 |
| 2007/0201490 | A1* | 8/2007 | Mahamuni .......... H04L 12/4625 370/395.54 |
| 2007/0230472 | A1* | 10/2007 | Jesuraj .................... H04L 45/04 370/392 |
| 2007/0253328 | A1* | 11/2007 | Harper ................ H04L 12/2602 370/219 |
| 2007/0288653 | A1* | 12/2007 | Sargor ............. H04L 29/12405 709/245 |
| 2008/0080535 | A1* | 4/2008 | Li ....................... H04L 12/4641 370/401 |
| 2008/0186965 | A1* | 8/2008 | Zheng ................ H04L 12/4633 370/389 |
| 2009/0238179 | A1 | 9/2009 | Samprathi |
| 2009/0240790 | A1* | 9/2009 | Utsunomiya ....... H04L 12/4645 709/221 |
| 2009/0257440 | A1* | 10/2009 | Yan et al. ..................... 370/401 |
| 2009/0262750 | A1* | 10/2009 | Miyoshi ............. H04L 12/4625 370/419 |
| 2010/0146160 | A1* | 6/2010 | Piekarski ................ G06F 13/28 710/28 |
| 2011/0235545 | A1* | 9/2011 | Subramanian .......... H04L 45/04 370/254 |
| 2011/0261700 | A1* | 10/2011 | Maisch ......................... 370/241 |
| 2012/0033541 | A1* | 2/2012 | Jacob Da Silva et al. ... 370/217 |
| 2012/0033672 | A1* | 2/2012 | Page ..................... H04L 45/245 370/395.53 |
| 2012/0281700 | A1* | 11/2012 | Koganti ........................ 370/392 |
| 2013/0094357 | A1* | 4/2013 | Sankar .................. H04L 45/586 370/230 |
| 2014/0189094 | A1 | 7/2014 | Ditya |
| 2014/0204760 | A1 | 7/2014 | Durrani et al. |
| 2014/0219077 | A1* | 8/2014 | Zhou .................. H04L 12/4641 370/217 |

OTHER PUBLICATIONS

Cisco Systems, Inc.. "Intermediate System-to-Intermediate System (IS-IS) TLVs "Document ID: 5739. Updated: Aug 10, 2005.*

U.S. Appl. No. 14/047,278, filed Oct. 7, 2013, in the name of Mohammad Durrani, et al., entitled "Optimizing Traffic Flows via Dynamic Routing Protocol Modifications when Using Server Virtualization with Dynamic Routing".

PCT Patent Application No. PCT/US2014/012563 filed on Jan. 22, 2014, in the name of Mohammed Durrani, et al., entitled "Optimizing Traffic Flows via Dynamic Routing Protocol Modifications when Using Server Virtualization with Dynamic Routing".

International Search Report & Written Opinion for PCT Application PCT/US2014/012563 mailed Aug. 28, 2014, 5 pages.

Menga, Justin: CCNP Practical Studies: Layer 3 Switching: Introduction to Layer 3 Switching ; Cisco Press, Nov. 26, 2003.

Non-Final Office Action for U.S. Appl. No. 14/047,278 mailed on Aug. 27, 2015, 34 pages.

* cited by examiner

OPTIMIZING TRAFFIC FLOWS VIA DYNAMIC ROUTING PROTOCOL MODIFICATIONS WHEN USING SERVER VIRTUALIZATION WITH DYNAMIC ROUTING

CROSS REFERENCES TO RELATED APPLICATIONS

The present application claims the benefit and priority under 35 U.S.C. 119(e) of the following provisional applications:
(1) U.S. Provisional Application No. 61/755,346, filed Jan. 22, 2013, entitled "STANDARD BASE VIRTUALIZATION OF OSPF WITH MCT";
(2) U.S. Provisional Application No. 61/755,350, filed Jan. 22, 2013, entitled "SERVER VIRTUALIZATION WITH DYNAMIC ROUTING";
(3) U.S. Provisional Application No. 61/770,745, filed Feb. 28, 2013, entitled "SERVER VIRTUALIZATION WITH DYNAMIC ROUTING USING ISIS PROTOCOL";
(4) U.S. Provisional Application No. 61/771,531, filed Mar. 1, 2013, entitled "SERVER VIRTUALIZATION WITH DYNAMIC ROUTING USING ISIS PROTOCOL"; and
(5) U.S. Provisional Application No. 61/799,039, filed Mar. 15, 2013, entitled "SERVER VIRTUALIZATION WITH DYNAMIC ROUTING."
The entire contents of these applications are incorporated herein by reference for all purposes.

BACKGROUND

Currently, when dynamic routing protocols such as Open Shortest Path First (OSPF) and Intermediate System-to-Intermediate System (IS-IS) are used in a network topology that includes switches/routers configured as a Virtual Router Redundancy Protocol (VRRP)/multi-chassis link aggregation group (MC-LAG) cluster, the nodes of the cluster cannot ensure "short-path" forwarding for all incoming data traffic. This means that some data traffic arriving at the nodes from client machines may unnecessarily traverse the inter-chassis link (ICL) between nodes before the traffic is forwarded to its final destination, possibly leading to congestion, traffic loss, and/or increased latency.

FIGS. 1A-1C depict an exemplary network environment 100 and corresponding flows that illustrate this problem. As shown in FIG. 1A, network environment 100 includes three network devices (e.g., switches/routers) 102, 104, and 106 that are part of a first network 106 (e.g., a provider network). Network devices 102, 104, and 106 are referred to herein as "provider edge" (PE) devices. Network environment 100 further includes a group of servers 110, 112, and 114 that are part of a second network 116 (e.g., a network core) connected to first network 106, and a network device (e.g., switch/router) 118 connected to PE devices 102, 104 respectively and a client 120. Network device 118 is referred to herein as a "client edge" (CE) device.

In the embodiment of FIG. 1A, PE devices 102 and 104 are grouped into an MC-LAG (e.g., Multi-Chassis Trunking, or MCT) cluster 122. Accordingly, there is an inter-chassis link (ICL) 128 between PE devices 102 and 104, as well as a plurality of links (124 and 126) that form a link aggregation group (LAG) between PE devices 102, 104 and CE device 118. For example, link 124 connects CE device 118 to interface IP address 1.1.1.1 and interface MAC address AAAA.AAAA.AAAA of PE device 102, and link 126 connects CE device 118 to interface IP address 1.1.1.2 and interface MAC address BBBB.BBBB.BBBB of PE device 104. In addition, PE devices 102 and 104 are configured/configurable to act in concert as a virtual router via VRRP (or variants thereof, such as VRRPe), such that PE devices 102 and 104 share a common virtual IP address (1.1.1.254) and a common virtual MAC address (CCCC.CCCC.CCCC).

The challenge with the configuration of FIG. 1A occurs when a dynamic routing protocol, or DRP, is implemented across network environment 100 (as shown in FIG. 1B). In a scenario where there is no dynamic routing, CE device 118 will typically store, within its Layer 3 (L3) routing table, the virtual IP address of cluster 122 as the next hop address for all routes leading to network core 116. However, in the scenario of FIG. 1B where dynamic routing is used, CE device 118 learns the individual interface IP addresses of PE devices 102 and 104 via the DRP, rather than the virtual IP address. Since links 124 and 126 are equal cost paths, this means that CE device 118 will store two next hop addresses in its L3 routing table for each destination in network core 116. For instance, in FIG. 1B, L3 routing table 130 includes next hop addresses 1.1.1.1 and 1.1.1.2 (corresponding to PE devices 102 and 104 respectively) for destination server 110 having IP address 2.2.2.2.

The foregoing can lead to the problematic sequence of events shown in FIG. 1C. At step (1) (reference numeral 132) of FIG. 1C, client 120 transmits a data packet destined for server 110 to CE device 118. At step (2) (reference numeral 134), CE device 118 selects, as the next hop for the packet, the interface IP address of PE device 102 (i.e., 1.1.1.1), resolves the interface MAC address for 1.1.1.1 (i.e., AAAA.AAAA.AAAA) via Address Resolution Protocol (ARP), and sets the destination MAC address of the packet to the interface MAC address. However, this does not guarantee that the data packet gets forwarded over link 124 to PE device 102. Instead, because links 124 and 126 are part of a LAG, CE device 118 performs a hash on the headers of the data packet, which happens to select link 126 (rather than link 124). Thus, in this case, the data packet is forwarded over link 126 to PE device 104, even though the destination MAC address included in the packet identifies the interface MAC address of PE device 102 (i.e., AAAA.AAAA.AAAA).

Upon receiving the data packet, PE device 104 determines that the destination MAC address does not correspond to its own interface MAC address and forwards the packet (at Layer 2) over ICL 128 to PE device 102 (step (3), reference numeral 136). PE device 102 then performs a route lookup in its L3 routing table based on the destination IP address in the packet (i.e., 2.2.2.2) and forwards the packet to the next hop in the shortest path to the destination (i.e., PE device 106) (step (4), reference numeral 138).

The issue with the flow shown in FIG. 1C is that the data packet is unnecessarily sent over ICL 128 from PE device 104 to PE device 102, even though PE device 104 is capable of forwarding the data packet directly to next hop 106. This act of transmitting the data packet over ICL 128 can have a number of detrimental effects. For instance, it can congest ICL 128, which reduces the amount of bandwidth available for other types of cluster communication traffic between PE devices 102 and 104. Further, the data packet can incur unnecessarily higher latency due to traversing ICL 128. Yet further, the uplinks from PE devices 102 and 104 to the network core can become congested due to uneven load sharing.

SUMMARY

Techniques for optimizing traffic flows via DRP modifications when server virtualization is used with dynamic routing are provided. In one embodiment, a network device can determine that it is part of a system of network devices acting as a virtual router. The network device can then transmit, to a client device, a DRP control packet that includes an interface IP address of the network device and a virtual IP address of the virtual router.

In a further embodiment, the client device can receive the DRP control packet and store the interface IP address and the virtual IP address in a routing database. At the time of computing routing entries based on the routing database (via, e.g., a shortest path first (SPF) algorithm), the client device can replace, in entries that identify the interface IP address as the next hop, the interface IP address with the virtual IP address.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure provides techniques for optimizing traffic flows in network topologies that implement VRRP (or its variants, such as VRRPe) and MC-LAG (e.g., MCT) in conjunction with dynamic routing protocols (e.g., OSPF, IS-IS, etc.). At a high level, these techniques enable each node in a VRRP/MC-LAG cluster to perform local L3 routing of data traffic, as along as the node is aware of a route to the destination. This avoids scenarios where the data traffic is unnecessarily forwarded across the ICL between cluster nodes, and thus eliminates or mitigates the issues associated with such scenarios (e.g., link congestion, data loss, higher latency, etc.).

Two sets of solutions are presented below. The first set (described in Section 1 and referred to as the "MAC synchronization" approach) involves modifications solely to the respective nodes in a VRRP/MC-LAG cluster, and thus can be implemented in a manner that is transparent to other devices outside of that cluster. The second set (described in Section 2 and referred to as the "DRP modification" approach) involve changes to the dynamic routing protocol (DRP) used by the network, and thus impacts the dynamic routing implementations in both the cluster nodes and the client devices that communicate with those nodes over DRP links.

1. MAC Synchronization

With the MAC synchronization approach, each node in a VRRP/MC-LAG cluster can implement logic for synchronizing its client-facing interface (i.e., physical) MAC address with other nodes in the same cluster. For example, as part of a cluster initialization process, each node can transmit its interface MAC address to the other nodes, as well as receive their corresponding interface MAC addresses. Upon receiving the interface MAC addresses, the node can store the addresses in a local L2 forwarding table, along with an enabled flag or bit (referred to herein as an "US" flag). The US flag can indicate that the interface MAC addresses are owned by cluster peer nodes.

At a later point in time, when a first node of the cluster receives a data packet to be forwarded, the first node can determine whether the destination MAC address included in the packet can be found in its L2 forwarding table with the US flag enabled. If so, the first node can conclude that the destination MAC address identifies a second node in the same cluster. In response, the first node can directly route the packet to the next hop towards the destination (if such a route exists in the first node's L3 routing table), in lieu of forwarding the packet over the ICL to the second node.

Figure 1A:
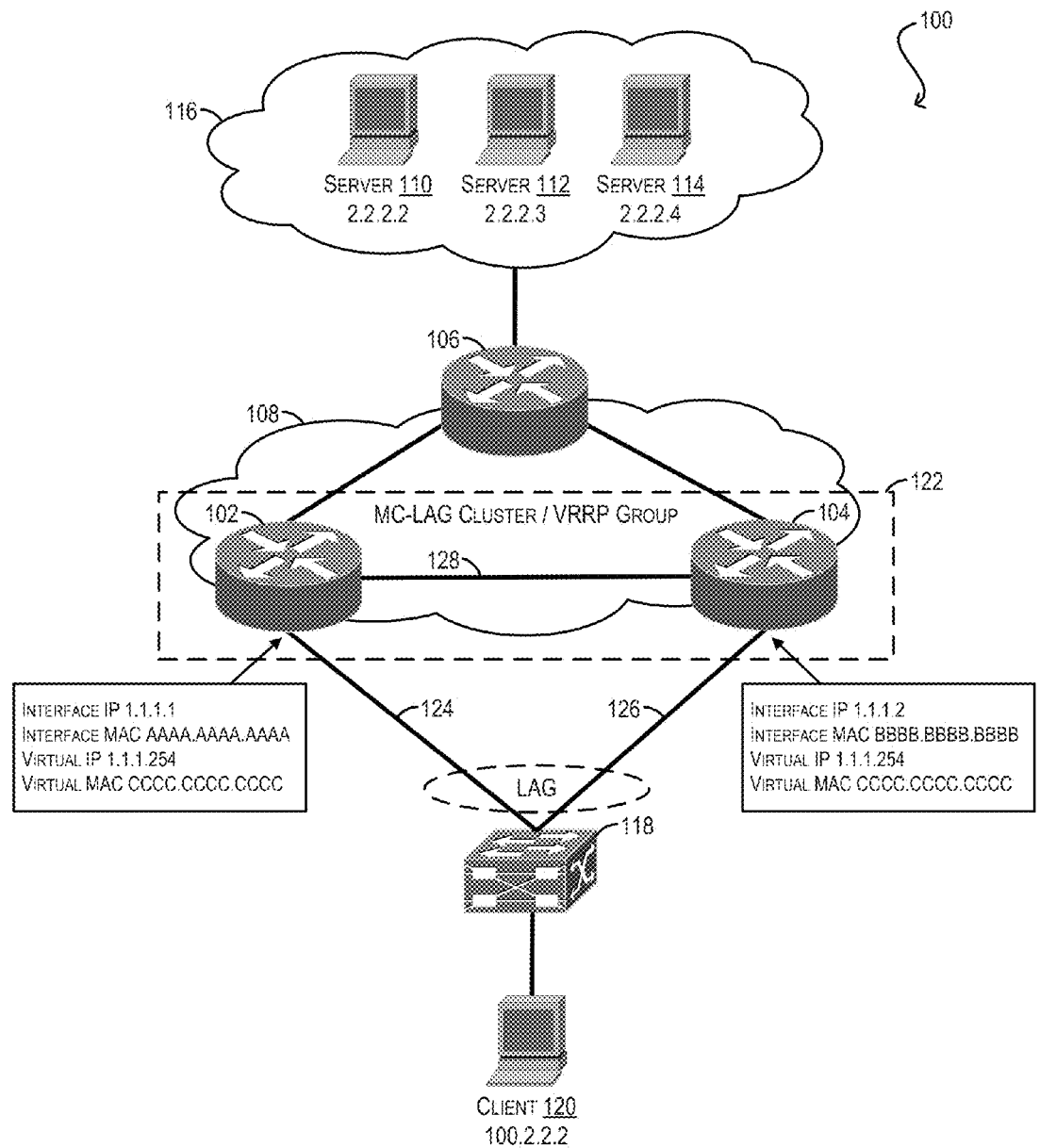
FIGS. 1A-1C depict an exemplary network environment comprising a VRRP/MC-LAG cluster according to an embodiment.
Figure 1B:
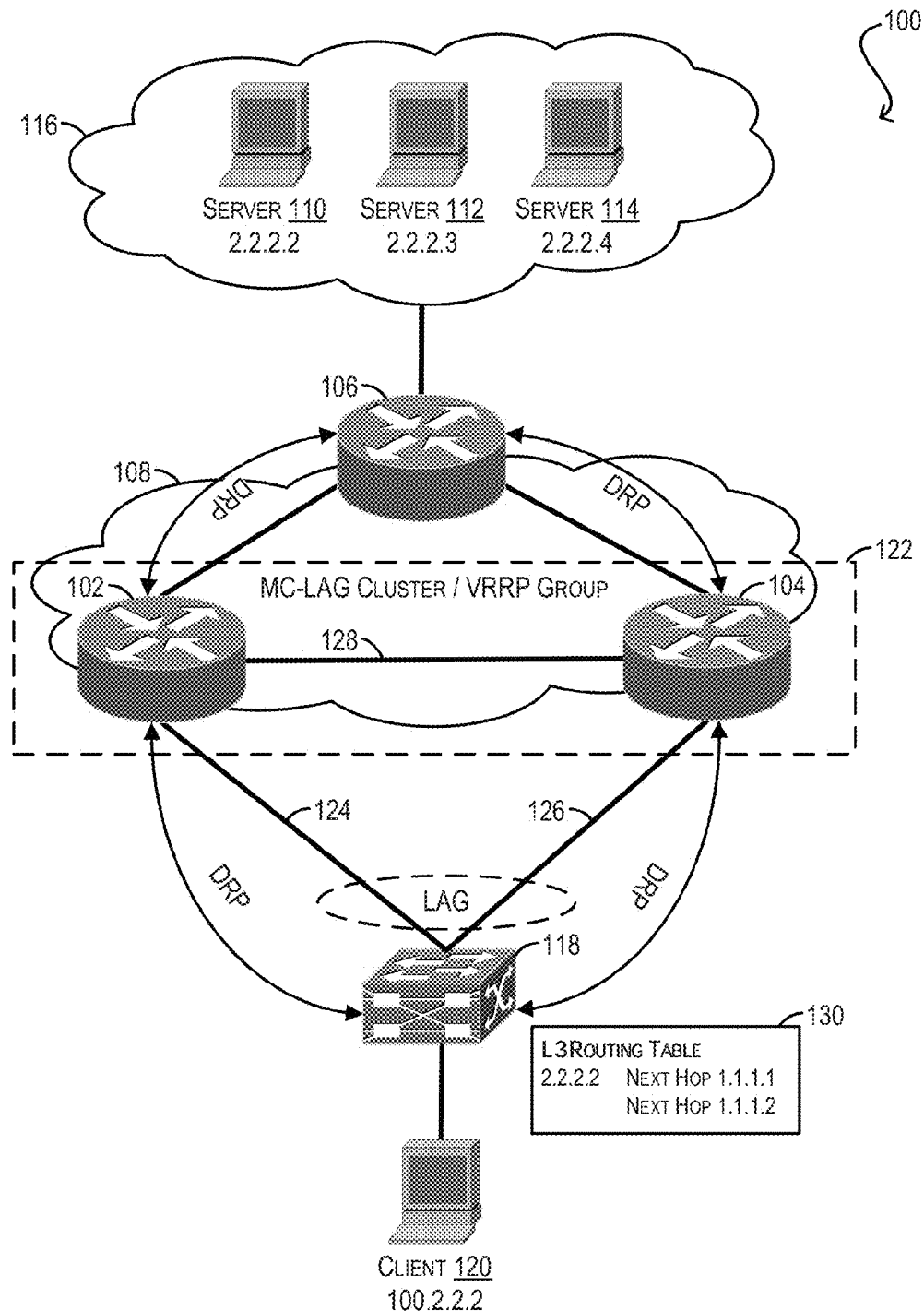
Figure 1C:
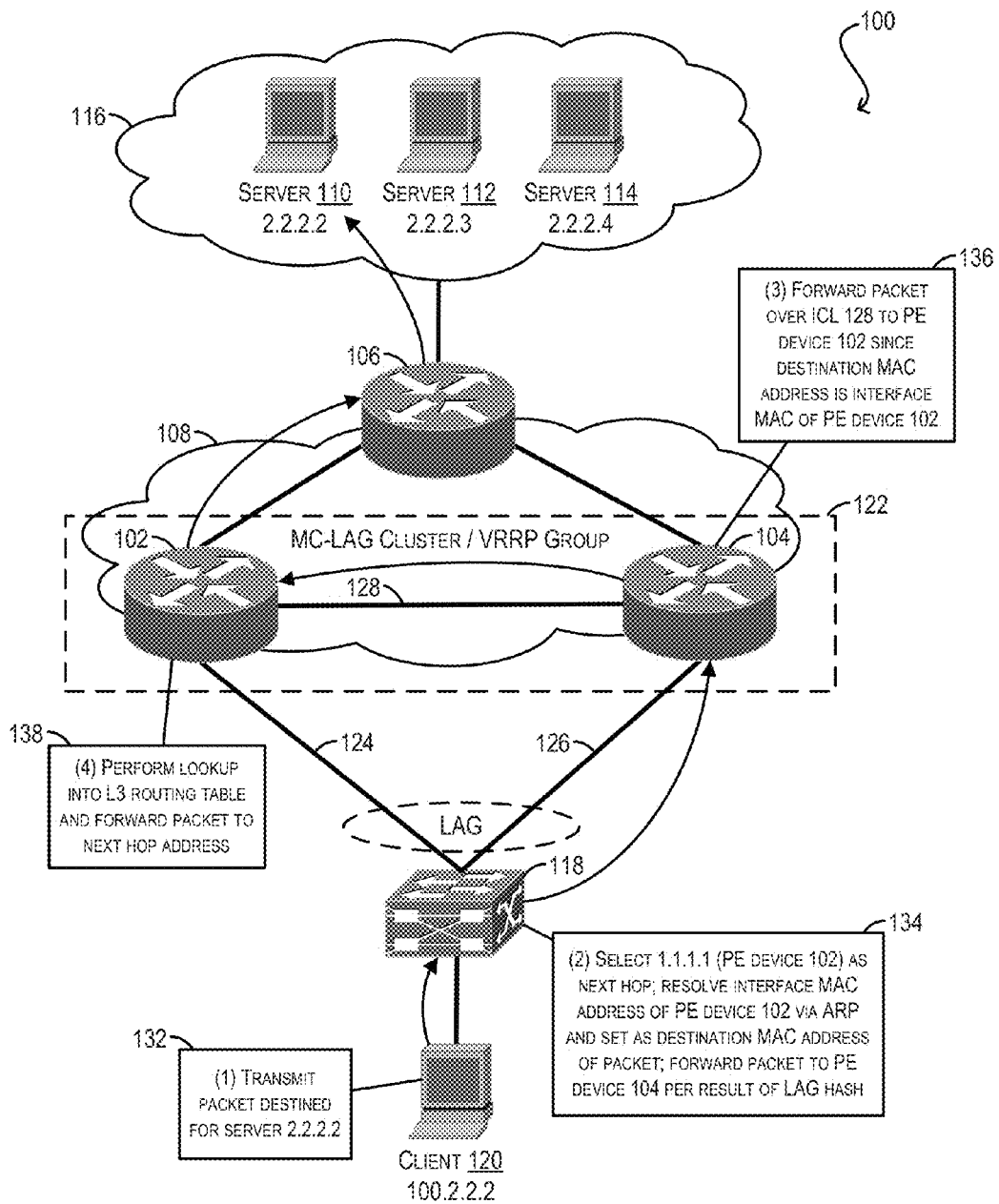

To better illustrate the processing described above, FIG. 2 depicts an exemplary MAC synchronization flow 200 with respect to VRRP/MC-LAG cluster 122 of FIGS. 1A-1C. As shown by the bi-directional arrow and callout identified by reference numeral 202, PE device 102 of cluster 122 can transmit its client-facing interface MAC address (i.e., AAAA.AAAA.AAAA) to PE device 104, thereby causing PE device 104 to store the interface MAC address in its L2 forwarding table. In addition, PE device 104 can enable the US flag for the address entry in table 206 (shown as bit value "1"). Similarly, PE device 104 can transmit its client-facing interface MAC address (i.e., BBBB.BBBB.BBBB) to PE device 102, thereby causing PE device 102 to store the interface MAC address in its L2 forwarding table 204. In addition, PE device 102 can enable the US flag for the address entry in table 204 (shown as bit value "1").

Figure 2:
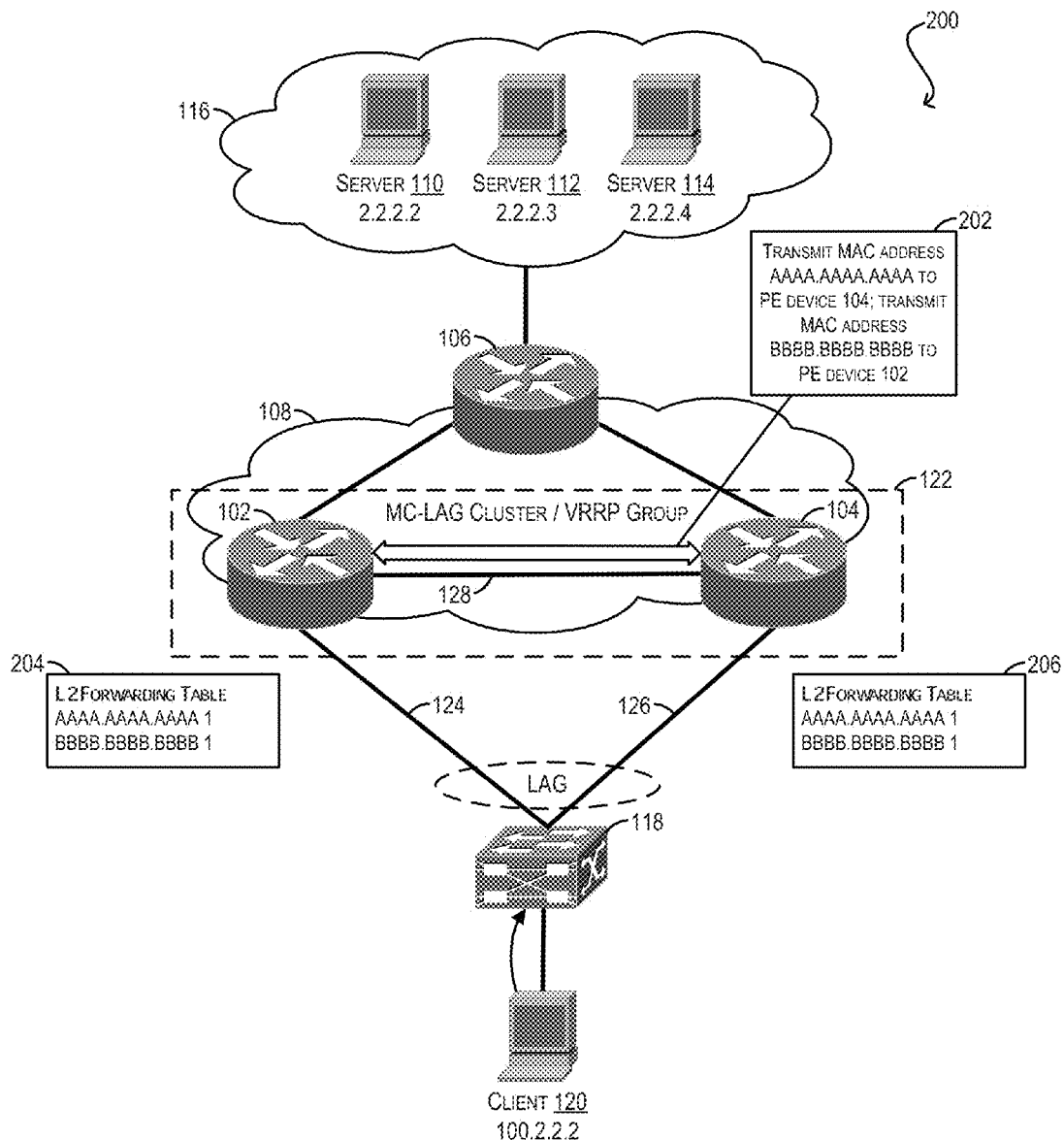
FIG. 2 depicts a flow for synchronizing MAC addresses between cluster nodes according to an embodiment.

In the embodiment of FIG. 2, the MAC address synchronization occurs over ICL 128 (via, e.g., a cluster communication protocol). However, in other embodiments, the synchronization can occur over an alternative communication channel between PE devices 102 and 104. Further, in the embodiment of FIG. 2, each PE device 102/104 is configured to include its own interface MAC address in its L2 forwarding table (with the US flag enabled).

Figure 3:
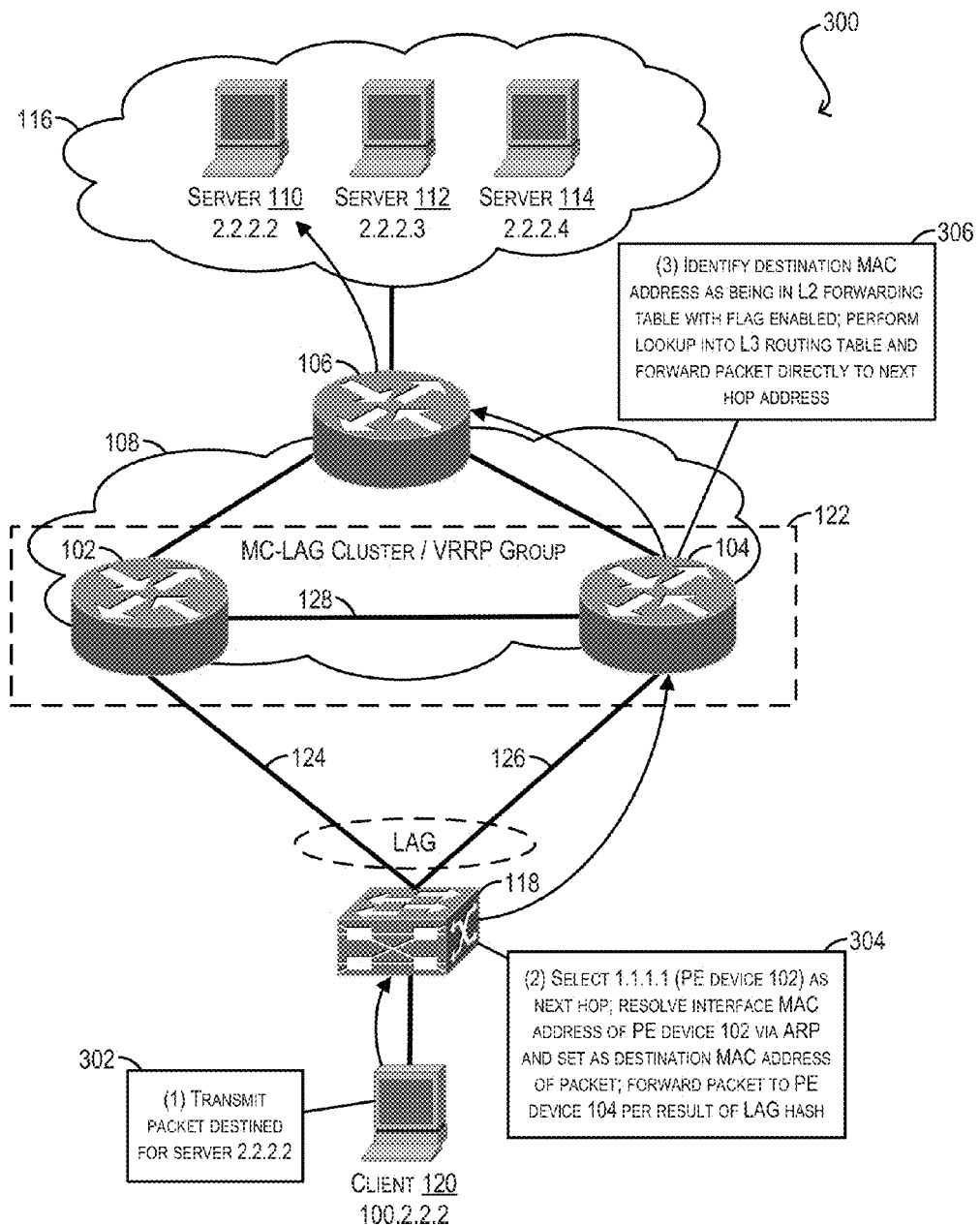
FIG. 3 depicts a flow for forwarding data traffic at a cluster node according to an embodiment.

Once the foregoing synchronization is complete, PE devices 102 and 104 of cluster 122 can carry out local L3 routing of incoming data traffic based on the synchronized interface MAC addresses. FIG. 3 depicts an example of such a flow (300) according to an embodiment.

At step (1) (reference numeral 302) of flow 300, client 120 can transmit a data packet destined for server 110 (having IP address 2.2.2.2) to CE device 118. At step (2) (reference numeral 304), CE device 118 can select, as the next hop for the packet, the interface IP address of PE device 102 (i.e., 1.1.1.1), resolve the interface MAC address for 1.1.1.1 (i.e., AAAA.AAAA.AAAA) via Address Resolution Protocol (ARP), and set the destination MAC address of the packet to the interface MAC address. In addition, because links 124 and 126 are part of a LAG, CE device 118 can perform a hash on the headers of the data packet which, by chance, selects link 126 (rather than link 124) for forwarding the data packet. This is identical to the scenario described at step (2) of FIG. 1C.

At step (3) (reference numeral 306), PE device 104 can receive the data packet and determine that the packet's destination MAC address (i.e., AAAA.AAAA.AAAA) is in its L2 forwarding table (i.e., table 206 of FIG. 2) with the US flag set/enabled. This allows PE device 104 to conclude that the destination MAC address is owned by a peer node in cluster 122. As a result, PE device 104 can perform a lookup into its L3 routing table for a next hop address (e.g., the address of PE device 106) and subsequently forward the data packet to the next hop, without sending the packet over ICL 128 to PE device 102.

It should be appreciated that a similar local routing process can be carried out at PE device 102 if CE device 118 decides to forward the data packet to device 102 with a destination MAC address of BBBB.BBBB.BBBB (i.e., the interface MAC address of PE device 104).

With the MAC synchronization approach shown in FIGS. 2 and 3, each node of cluster 122 can locally route incoming data traffic to its next hop destination, even if the destination MAC addresses for the traffic point to other nodes of the cluster. This, in turn, avoids the need to L2 forward such traffic over ICL 128, which can reduce congestion on ICL 128, prevent uneven load sharing on the node uplinks, and ensure that the traffic traverses over the shortest path to its destination. Another significant benefit of this approach is that its implementation is encapsulated entirely within the nodes of cluster 122 (i.e., PE devices 102 and 104). Accordingly, the MAC synchronization approach does not require any changes to other entities in network environment 100, such as CE device 118.

Figure 4A:
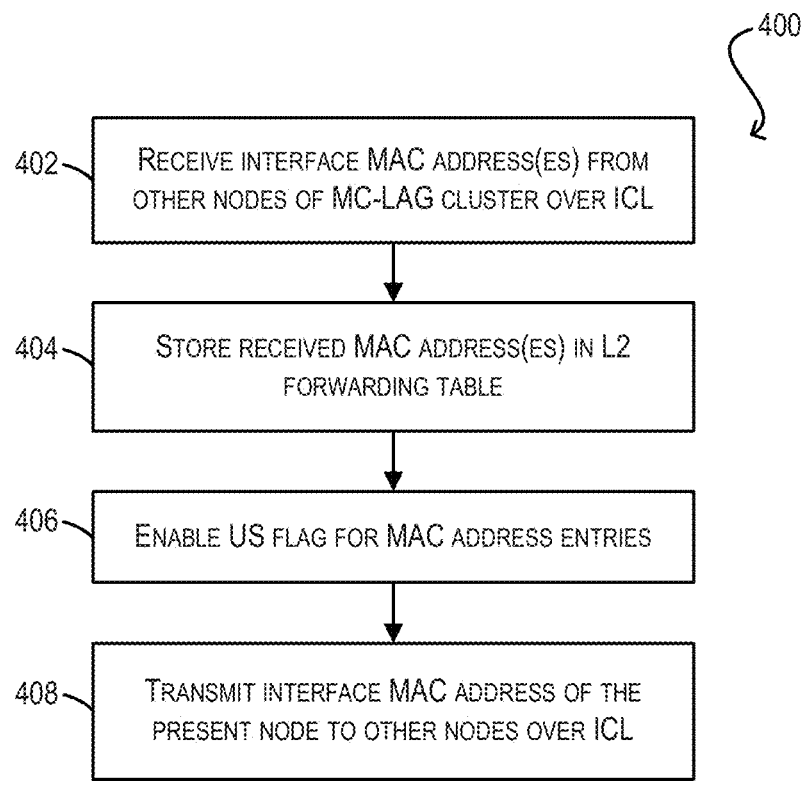
FIGS. 4A and 4B are flowcharts that provide additional details regarding the flows of FIGS. 2 and 3 according to an embodiment.

FIG. 4A depicts a flowchart 400 that provides further details regarding the MAC synchronization process that can be executed by each PE device 102/104 of cluster 122. In a particular embodiment, flowchart 400 can be carried out during an initialization phase for cluster 122.

At block 402, PE device 102/104 can receive interface MAC address(es) from other nodes of cluster 122. As noted previously, PE device 102/104 may receive these addresses via, e.g., ICL 128 or an alternative communication channel.

At block 404, PE device 102/104 can store the received interface MAC address(es) in its L2 forwarding table, thereby "synchronizing" the addresses. As part of this process, PE device 102/104 can enable the US flag for each newly created L2 table entry (block 406).

Finally, at block 406, PE device 102/104 can transmit its own interface MAC address to the other nodes of cluster 122 so that they can store the address in their respective L2 forwarding tables.

Figure 4B:
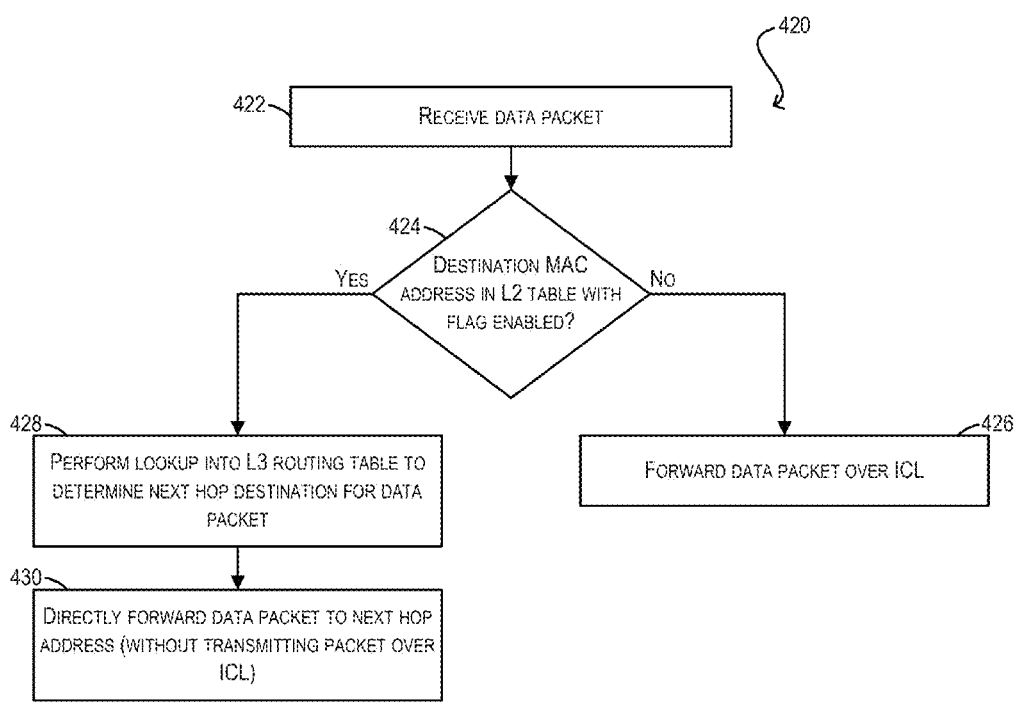

FIG. 4B depicts a flowchart 420 that provides further details regarding the local routing that can be performed by each PE device 102/104 of cluster 122 (per step (3) of FIG. 3) once the MAC synchronization described in flowchart 400 is in place. At block 422, PE device 102/104 can receive a data packet to be forwarded. At block 424, PE device 102/104 can perform a lookup into its L2 forwarding table and determine whether the destination MAC address included in the packet is present in the table with the US flag set/enabled.

If the destination MAC address is not present in the L2 forwarding table (or is present with the US flag disabled), PE device 102/104 can L2 forward the data packet over ICL 128 to another node of cluster 122 (block 426). The receiving node can then perform appropriate steps for routing the packet.

On the other hand, if the destination MAC address is present in the L2 forwarding table with the US flag set/enabled (thereby indicating that the destination MAC address corresponds to the interface MAC address of another cluster node), PE device 102/104 can launch a lookup into its local L3 routing table to determine the next hop address for the data packet (block 428). Assuming that PE device 102/104 finds a routing entry in the L3 routing table that points to an uplink next hop, PE device 102/104 can generate an ARP request for resolving the MAC address corresponding to the next hop address. PE device 102/104 can then forward the data packet to the next hop, without having to transmit the data packet over ICL 128 to any other node of cluster 122 (block 430).

In an alternative scenario (not shown), if the routing entry points to another node of cluster 122 as the shortest path next hop, PE device 102/104 can L2 forward the data packet over ICL 128 to that node. In this scenario, PE device 102/104 can disable the US flag for the interface MAC address of that node in its L2 forwarding table.

1.1 Failure Scenarios

The following sub-sections describe various failure scenarios that may occur in network environment 100 when the MAC synchronization solution above is implemented, as well as the behavior of the various network elements in each scenario.

1.1.1 Scenario 1: Active Cluster Client Edge Port (CCEP) Goes Down

As used herein, "Active CCEP" refers to the port of VRRP/MC-LAG cluster 122 that is actively carrying data traffic to/from CE device 118. In one embodiment, this scenario can proceed as follows:

1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this example, the port of PE device 104 connected to CE device 118 is carrying data traffic and is therefore the Active CCEP.
3. A failure of the Active CCEP link (i.e., link 126) occurs while traffic is flowing.
4. CE device 118 detects the failure of link 126 and the DRP session between CE device 118 and PE device 104 goes down; there is intermittent traffic loss while the DRP converges.
5. CE device 118 installs only one best path in its L3 routing table to destination server 110, which is through PE device 102.
6. Traffic flows over the link from CE device 118 to PE device 102 (i.e., link 124).
7. The DRP session between CE device 118 and PE device 104 comes up again because DRP hello packets reach CE device 118 via ICL 128.
8. CE device 118 again installs two routes in its L3 routing table: one via PE device 102 and the other via PE device 104.

The benefit of the MAC synchronization approach in this scenario is that, even if CE device 118 picks PE device 104 as the next hop, the data packet will traverse link 124 to PE device 102. Further, since the L2 forwarding table of PE device 102 is programmed with the interface MAC address of PE device 104 with the US flag enabled, PE device 102 will directly forward the data packet using an L3 lookup (without attempting to L2 forward the packet over the ICL 128 to PE device 104).

1.1.2 Scenario 2: Standby CCEP Goes Down

As used herein, "Standby CCEP" refers to the port of VRRP/MC-LAG cluster 122 that is not actively carrying data traffic to/from CE device 118. In one embodiment, this scenario can proceed as follows:

1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this example, the port of PE device 104 connected to CE device 118 is carrying data traffic and is therefore the Active CCEP. The port of PE device 102 connected to CE device 118 is the Standby CCEP.
3. A failure of the Standby CCEP link (i.e., link 124) occurs while traffic is flowing through the Active CCEP link.
4. CE device 118 detects the failure of link 124 and the DRP session between CE device 118 and PE device 102 goes down; since there is no traffic over this link, no data is lost as the DRP converges.
5. CE device 118 installs only one best path in its L3 routing table to destination server 110, which is through PE device 104.
6. Traffic continues to flow over the Active CCEP link.
7. The DRP session between CE device 118 and PE device 102 comes up again because DRP hello packets reach PE device 102 via ICL 128.
8. CE device 118 again installs two routes in its L3 routing table: one via PE device 102 and the other via PE device 104.

The benefit of the MAC synchronization approach in this scenario is that, even if CE device 118 picks PE device 102 as the next hop, the data packet will traverse via link 126 to PE device 104. Further, since the L2 forwarding table of PE device 104 is programmed with the interface MAC address of PE device 102 with the US flag enabled, PE device 104 will directly forward the packet using an L3 lookup (without forwarding the packet over ICL 128 to PE device 102).

1.1.3 Scenario 3: ICL Goes Down

In one embodiment, this scenario can proceed as follows:
1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this example, the port of PE device 104 connected to CE device 118 is carrying data traffic and is therefore the Active CCEP. The port of PE device 102 connected to CE device 118 is the Standby CCEP.
3. ICL 128 goes down.
4. Case A: If there is no alternative L2 connectivity between PE devices 102 and 104:
   a. PE devices 102 and 104 reprogram their respective Layer 2 forwarding tables to clear/disable the US flag for each entry, since MAC synchronization can no longer occur due to ICL failure.
   b. PE devices 102 and 104 each behave as an independent router and thus forward data traffic after L3 lookup.
   c. DRP adjacency between PE devices 102 and 104 over ICL 128 goes down once DRP "dead time" expires (e.g., 40 seconds in the case of OSPF).
5. Case B: If there is alternative L2 connectivity between PE devices 102 and 104:
   a. DRP hello packets between PE devices 102 and 104 flood over the alternative L2 link; thus, DRP adjacency does not go down.
   b. The US flag remains enabled in the forwarding tables for PE devices 102 and 104 since DRP adjacency does not go down.

1.1.4 Scenario 4: ICL Goes Down (with Keepalive VLAN Provisioned)

This scenario may occur when ICL 128 goes down with a keepalive VLAN provisioned between PE devices 102 and 104. In one embodiment, this scenario can proceed as follows:

1. With the keepalive VLAN provisioned, election of master and slave nodes in cluster 122 occurs when ICL 128 goes down. The node with the lower Rbridge-ID becomes the master; the node with the higher Rbridge-ID becomes the slave and the slave brings down its corresponding CCEP ports.
2. The US flags in the L2 forwarding tables of PE devices 102 and 104 are cleared/disabled.
3. DRP adjacency between CE device 118 and the slave node (e.g., PE device 104), as well as between PE devices 102 and 104, goes down.
4. Since DRP adjacency between CE device 118 and the slave node is lost, CE device 118 will only have one best path to the destination (through the master node).

1.1.5 Scenario 5: Uplink Port Goes Down

This scenario may occur when the uplink port (towards network core 116) on either PE device 102 or 104 goes down. In one embodiment, this scenario can proceed as follows:

1. Each cluster node (i.e., PE device 102/104) tracks the status of its uplink ports; in one embodiment, this can be a user-configurable option.
2. The US flag(s) in the L2 forwarding table of the node is cleared if all of the ports on the node's track port list go down; if any port in the track port list remains up, the US flag is not cleared.
3. Users can be given the option to clear/disable the US flag based on a user-defined priority threshold; this is to avoid uplink oversubscription in cases where there are ECMP paths and where the customer has a concern that local forwarding should only remain intact if sufficient bandwidth on the uplink ports is conserved; the same applies if the uplink is a multi-slot LAG port.
4. Once the US flag is cleared on a given node, incoming packets at that node which have a destination MAC address that does not match the node's interface MAC address will be L2 forwarded over ICL 128 to the other node; the other node will then perform a L3 lookup and forward the packets.

1.1.6 Scenario 6: Node Failure

This scenario may occur when a cluster node (i.e., PE device 102/104) goes down after being operational and actively carrying traffic. In one embodiment, this scenario can proceed as follows:

1. PE device 102 goes down.
2. The DRP session between CE device 118 and PE device 102, as well as between PE devices 102 and 104, also goes down.
3. The US flag on PE device 104 remains enabled; this implies that if a data packet is received at PE device 104 with a destination MAC address matching the interface MAC address of PE device 102, PE device 104 will attempt to L3 forward the packet (if a route exists).

4. CE device 118 performs SPF computation and re-computes all paths via PE device 104.

5. All traffic from CE device 118 is hashed to PE device 104 and is forwarded based on the L3 lookup.

1.1.7 Scenario 7: Node Comes Back Up

This scenario may occur when a cluster node (i.e., PE device 102/104) comes back up as part of, e.g., an operational SW/HW upgrade or reloaded by a network operator due to some unforeseen reason. In one embodiment, this scenario can proceed as follows:

1. Assume that the prior steps in scenario 6 have already occurred.

2. PE device 102 comes back up, which causes the LAG ports to be operational before the DRP re-converges; this can cause a race condition on CE device 118 in cases where the destination MAC address for a given data packet points to PE device 104 but the LAG hash results in the data packet being sent over link 124 to PE device 102; PE device 102 will not have a route to the destination, causing a traffic "black hole."

3. To avoid this race condition:
   a. The US flag in the L2 forwarding table of PE device 102 can be disabled.
   b. PE device 102 can install a default route to forward all traffic to PE device 104, with the assumption that PE device 104 will have an appropriate routing entry.
   c. Once DRP adjacency between CE device 118 and PE device 102 is back up, the US flag in the L2 forwarding table of PE device 102 can be re-enabled.

2. DRP Modifications for Advertising VRRP Virtual IP Address

As an alternative to the MAC synchronization approach described in Section 1, in certain embodiments the various entities of network environment 100 can implement a modified dynamic routing protocol (e.g., a modified OSPF or IS-IS protocol) in order to avoid unnecessary traffic forwarding over ICL 128 of cluster 122. In these embodiments, each node (i.e., PE device 102/104) of VRRP/MC-LAG cluster 122 can transmit (as part of the normal DRP link state advertisement process) a new type of DRP control packet to CE device 118. This new DRP control packet can advertise the virtual IP address of cluster 122, the node's interface IP address, and optionally the virtual MAC address of cluster 122.

Upon receiving the control packet, CE device 118 can store the information included in the packet in a local routing database. Then, when CE device 118 is in the process of computing/generating its local L3 routing table, CE device 118 can modify each routing entry that points to the interface IP address included in the control packet (as the next hop address for a destination) such that the entry points instead to cluster 122's virtual IP address. As described in further detail below, this causes CE device 118 to forward data packets originating from, e.g., client 120 to the virtual MAC address of cluster 122, rather than the interface MAC address of a particular node in the cluster.

At a later point in time, when one of the cluster nodes (e.g., PE device 102 or 104) receives a data packet forwarded by CE device 118, the node can check its L2 forwarding table to determine whether the destination MAC address in the packet (i.e., the virtual MAC address of cluster 122) is present in the table with the US flag enabled. In a particular embodiment, the node can be preconfigured to store this virtual MAC address in the L2 forwarding table by virtue of its VRRP implementation (e.g., VRRPe). Upon determining that the virtual MAC address is present in the table with the US flag enabled, the node can directly route the packet to its destination, without forwarding the packet over ICL 128 to another node of cluster 122.

To better illustrate the processing described above, FIG. 5 depicts an exemplary DRP link state advertisement flow 500 with respect to network environment 100 according to an embodiment. As shown, as part of this flow, each PE device 102/104 of VRRP/MC-LAG cluster 122 can detect that it is part of a virtual router configuration and transmit a new type of DRP control packet (502/504) to CE device 118. Control packet 502/504 can include, e.g., the virtual IP address of cluster 122 (i.e., 1.1.1.254) and the interface IP address of the originating node (1.1.1.1 in the case of control packet 502, 1.1.1.2 in the case of control packet 504). In certain embodiments, control packet 502/504 can also include the virtual MAC address of cluster 122 (i.e., CCCC.CCCC.CCCC).

Once CE device 118 has received control packets 502 and 504 from PE devices 102 and 104 respectively, CE device 118 can store the information included in the control packets in a local routing database. CE device 118 can then run a Shortest Path First (SPF) algorithm on the routing database to generate routing entries for its Layer 3 routing table. As part of this processing, CE device 118 can identify routing entries that point to the interface IP address of either PE device 102 or 104 as the next hop address, and can replace those interface IP addresses with the virtual IP address of cluster 122. This results in a routing table that contains routing entries pointing to the VRRP virtual IP address, rather than the interface IP addresses of PE devices 102 and 104. This is illustrated in L3 routing table 130 of FIG. 5, which shows the next hop address for destination 2.2.2.2 as being virtual IP address 1.1.1.254.

Figure 6:
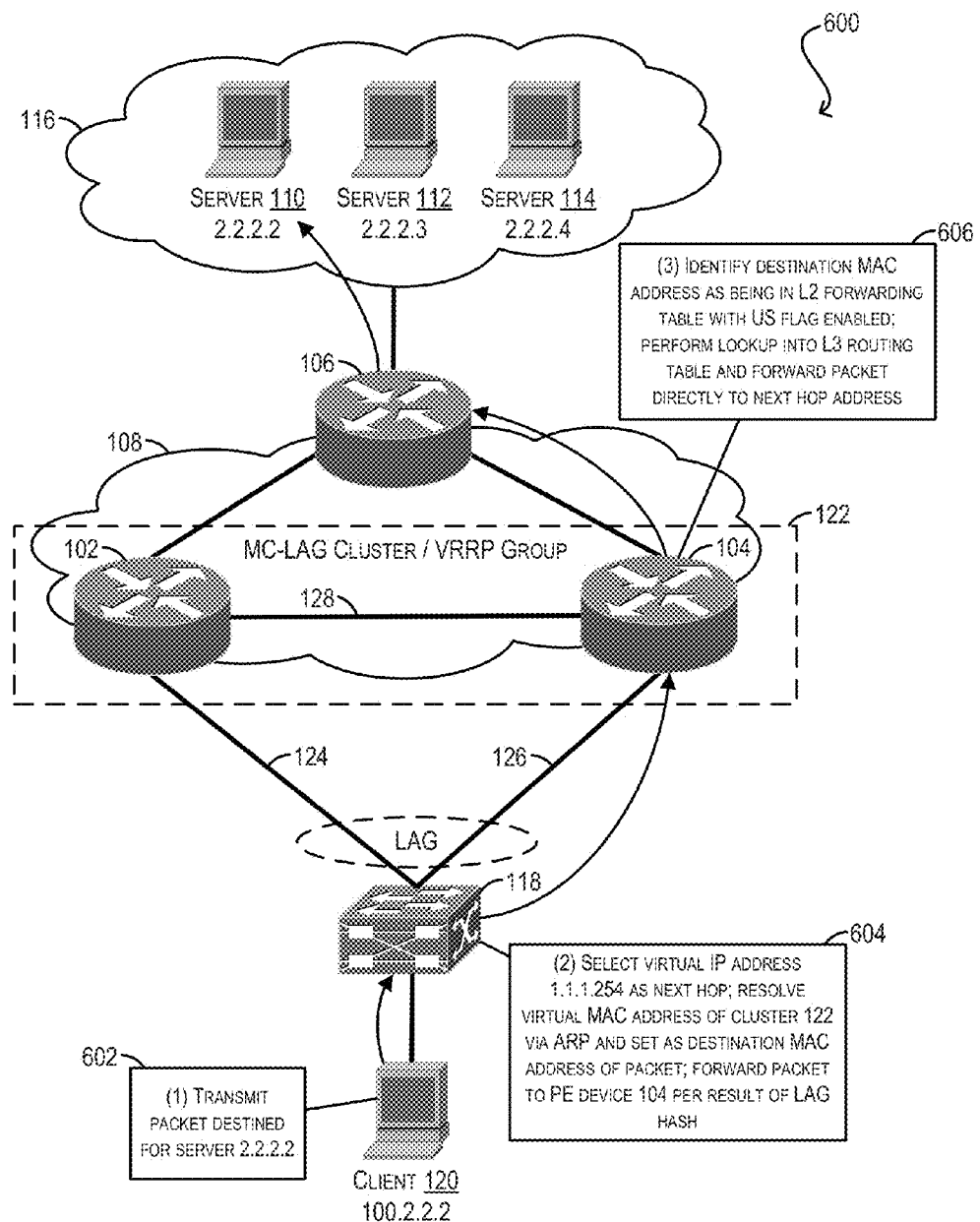
FIG. 6 depicts an exemplary structure for an IS-IS TLV according to an embodiment.

After CE device 118 has computed its L3 routing table as described above, network environment 100 can route data traffic between client 120 and network core 116 in the manner shown in flow 600 of FIG. 6. At step (1) (reference numeral 602) of flow 600, client 120 can transmit a data packet destined for server 110 (having IP address 2.2.2.2) to CE device 118. At step (2) (reference numeral 604), CE device 118 can select, as the next hop for the packet, the virtual IP address for cluster 122 (i.e., 1.1.1.254), resolve the corresponding virtual MAC address for 1.1.1.254 (i.e., CCCC.CCCC.CCCC) via Address Resolution Protocol (ARP), and set the destination MAC address of the packet to the virtual MAC address. In addition, because links 124 and 126 are part of a LAG, CE device 118 can perform a hash on the headers of the data packet and select either link 124 to PE device 102 or link 104 to PE device 104 for forwarding the packet. In this example, CE device 118 selects link 126 to PE 104.

At step (3) (reference numeral 606), PE device 104 can receive the data packet and determine that the packet's destination MAC address (i.e., virtual MAC address CCCC.CCCC.CCCC) is included in its L2 forwarding table with the US flag set/enabled (as noted previously, PE device 104 may be preconfigured to store this virtual MAC address in the L2 forwarding table by virtue of its VRRP implementation). In response to finding the virtual MAC address in the L2 forwarding table, PE device 104 can perform a lookup into its L3 routing table for a next hop address (e.g., the address of PE device 106) and subsequently forward the data packet to the next hop.

It should be appreciated that a similar local routing process can be carried out at PE device 102 if CE device 118 decides to forward the data packet to PE device 102 rather than PE device 104.

Figure 5:
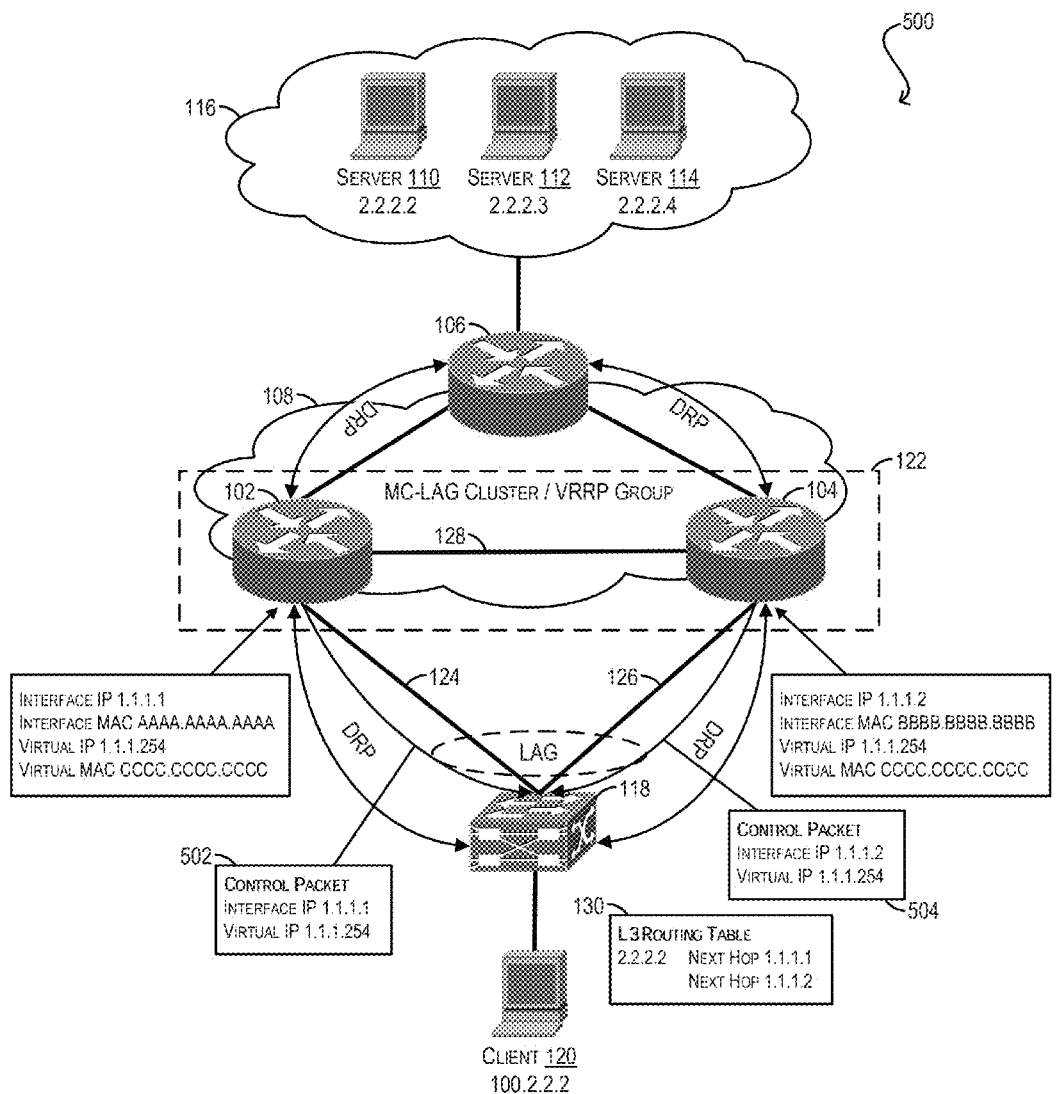
FIG. 5 depicts a flow for transmitting/processing DRP control packets according to an embodiment.

With DRP modification approach shown in FIGS. 5 and 6, each node of cluster 122 can ensure short-path forwarding for incoming data traffic in a manner similar to the MAC synchronization approach described in Section 1. However, unlike the MAC synchronization approach, the DRP modification approach does not require the various nodes of a VRRP/MC-LAG cluster to cooperate in order to synchronize their respective MAC addresses. Instead, this approach can rely solely on changes to the dynamic routing protocol itself (e.g., the new DRP control packet described above), which can be standardized and implemented by various network vendors.

For example, in embodiments where the DRP is OSPF, the control packet can be implemented as a new, standard "Type 12" OSPF link state advertisement (LSA). The following table illustrates an exemplary structure for this Type 12 LSA:

TABLE 1

OSPF Link TLV Sub TLV

| Sub-TLV Number | Name | Length in Octets |
| --- | --- | --- |
| 1 | Link type | 1 |
| 2 | Link ID | 4 |
| 3 | Local Interface IP Address | 4 |
| 4 | Remote Interface IP Address | 4 |
| 5 | Virtual IP Address | 4 |

In the table above, the Link Type field can indicate whether the link is a point-to-point (p2p) or multi-access link. Further, the Link ID field can identify the other end of the link (i.e., the neighbor to which the link is connected). For example, the Link ID field can be set to a neighbor router-id (if the link is p2p) or the neighbor's IP address (if the link is multi-access).

The Local Interface IP Address field can specify the IP address of the interface corresponding to the link. If the interface has multiple IP addresses, all addresses can be mentioned.

The Remote Interface IP Address field can specify the IP address of the neighbor's interface corresponding to the link. This address and the local address can be used to distinguish multiple parallel links between routers. If the Link type is multi-access, the Remote Interface IP Address field can be set to 0.0.0.0.

Finally, the Virtual IP Address field can specify the VRRP virtual IP address. The remote virtual IP and local address fields can be used to distinguish multiple parallel links between routers configured with virtual IP addresses for different subnets.

Figure 7:
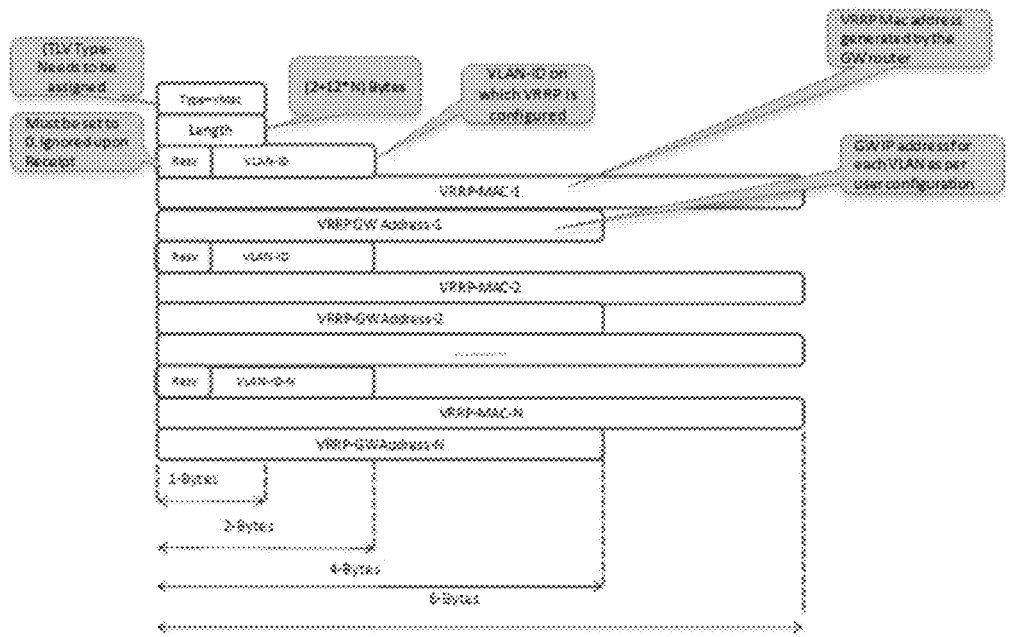
FIG. 7 depicts another flow for forwarding data traffic at a cluster node according to an embodiment.

In alternative embodiments where the DRP is IS-IS, the control packet can be implemented as a new, standard IS-IS TLV (type-length-value) packet. FIG. 7 depicts an exemplary structure for such a TLV according to an embodiment. In FIG. 7, the TLV type field can correspond to a number which maps to the IANA table regarding the type of information the TLV contains. For example, in one embodiment, the TLV type for the new TLV can be 128. The Length field can identify the actual TLV length, which can depend on the interface MTU. The VLAN ID field can specify the VLAN ID of the interface generating LSP. The VRRP MAC field can specify the virtual MAC address for the VRRP group/cluster. The finally, the Virtual GW Address field can specify the VRRP virtual IP address. As with the OSPF LSA, the remote Virtual IP and local address fields can be used to distinguish multiple parallel links between routers configured with virtual IP addresses for different subnets.

Figure 8A:
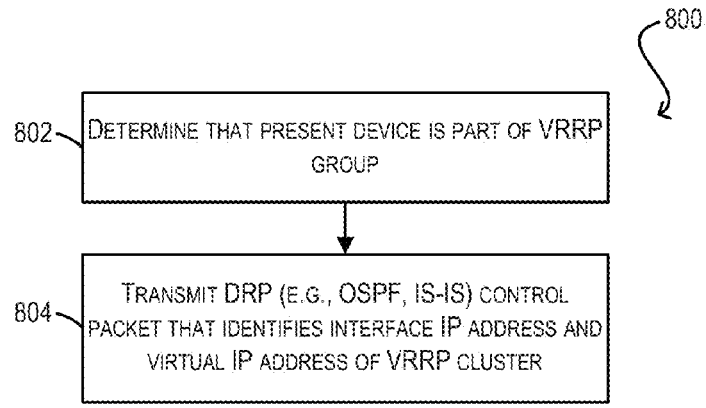
FIGS. 8A-8C are flowcharts that provide additional details regarding the flows of FIGS. 5 and 7 according to an embodiment.
Figure 8B:
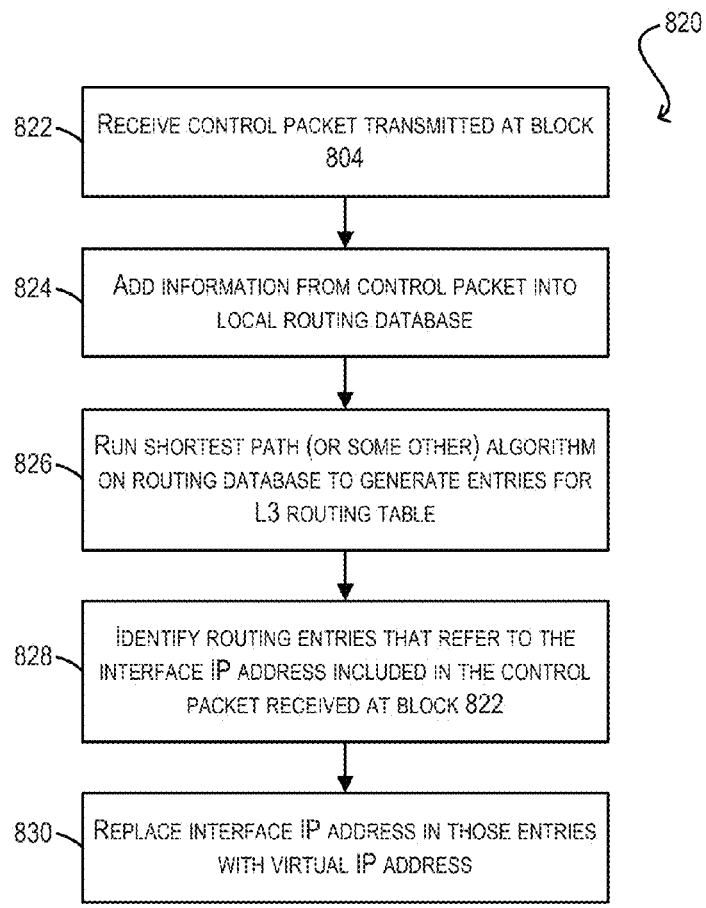

FIGS. 8A and 8B depict flowcharts 800 and 820 that provide further details regarding the DRP advertisement/routing table generation process described with respect to FIG. 5 according to an embodiment. Flowchart 800 can be performed by each node (i.e., PE device 102/104) of cluster 122, while flowchart 820 can be performed by CE device 118.

At block 802, PE device 102/104 can determine that it is part of a VRRP group/cluster (i.e., cluster 122). In response, PE device 102/104 can transmit a DRP (e.g., OSPF or IS-IS) control packet that identifies the interface IP address of device 102/104, the virtual IP address of cluster 122, and optionally the virtual MAC address of cluster 122 to CE device 118 (block 804). In the case of OSPF, the control packet can be a new Type 12 OSPF LSA as shown Table 1. In the case of IS-IS, the control packet can be a new IS-IS TLV as shown in FIG. 7.

Turning now to flowchart 820, at blocks 822 and 824, CE device 118 can receive the control packet transmitted by PE device 102/104 at block 804 and can add the information included in the control packet to a local routing database. CE device 118 can subsequently run an SPF algorithm on the routing database to generate entries for its L3 routing table (block 826). As part of this table generation process, CE device 118 can identify routing entries that refer to the interface IP address included in the control packet received at block 822 (block 828). CE device 118 can then replace the interface IP address in those entries with the virtual IP address (block 830). For example, assume that the L3 routing table includes an entry for destination 2.2.2.2 that indicates the next hop address is 1.1.1.1 (i.e., the interface IP address for PE device 102). In this case, CE device 118 can modify the entry by replacing 1.1.1.1 with 1.1.1.254 (the virtual IP address of cluster 122). In this way, CE device 118 can ensure that it properly resolves the virtual MAC address corresponding to the virtual IP address (rather than the interface MAC address of either PE device 102 or 104) when forwarding data traffic toward cluster 122.

Figure 8C:
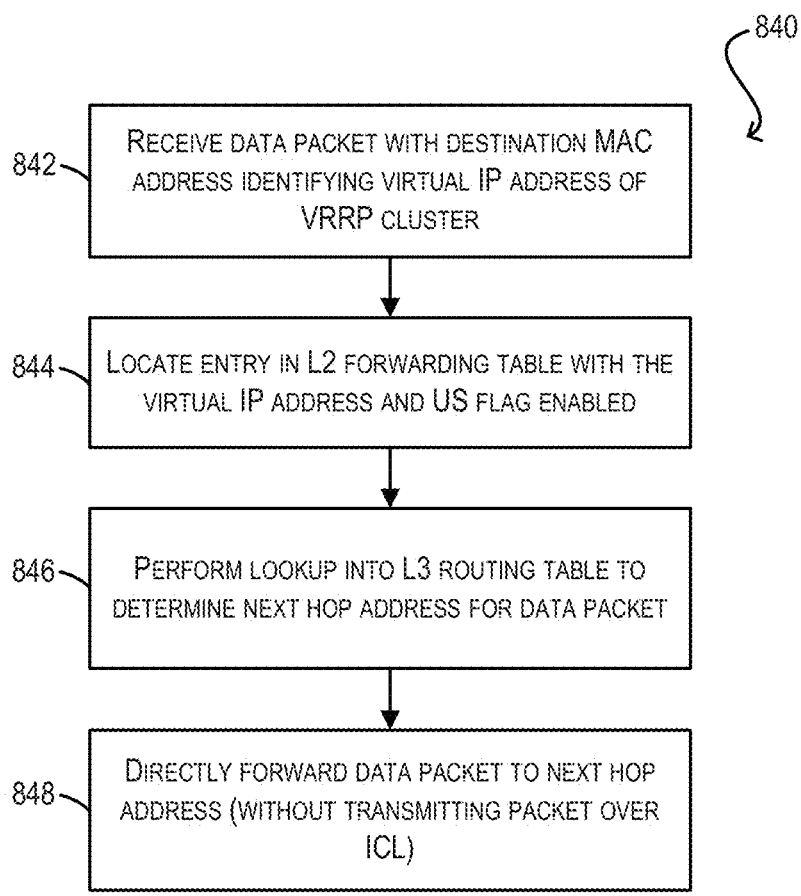

FIG. 8C depicts a flowchart 840 that provides further details regarding the local routing that can be performed by each PE device 102/104 of cluster 122 (per step (3) of FIG. 6) once the DRP advertisement/routing table generation of FIGS. 8A and 8B is completed. At block 842, PE device 102/104 can receive a data packet with a destination MAC address that identifies the virtual MAC address of cluster 122. At block 424, PE device 102/104 can perform a lookup into its L2 forwarding table based on the virtual MAC address. As noted previously, in certain embodiments PE device 102/104 may already include (via its VRRPe implementation) logic for storing the virtual MAC address in its Layer 2 forwarding table with the US flag enabled. Accordingly, at block 424, PE device 102/104 can find the forwarding table entry corresponding to the virtual MAC address. In response, PE device 102/104 can launch a lookup into its local Layer 3 routing table for a next hop IP address (block 846).

Assuming that PE device 102/104 finds an appropriate routing entry, PE device 102/104 can generate an ARP request for resolving the MAC address corresponding to the next hop IP address. PE device 102/104 can then forward the data packet to the next hop, without having to transmit the data packet over ICL 128 to any other node of cluster 122 (block 848).

In an alternative scenario (not shown), if the routing entry points to another node of cluster 122 as the shortest path next hop, PE device 102/104 can L2 forward the data packet over ICL 128 to that node.

2.1 Failure Scenarios

The following sub-sections describe different failure scenarios that may occur in network environment 100 when the DRP modification solution above is implemented, as well as the behavior of the various network elements in each scenario.

2.1.1 Scenario 1: Active CCEP Goes Down

In one embodiment, this scenario can proceed as follows:
1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this case, the port of PE device 104 connected to CE device 118 is carrying data traffic and is therefore the Active CCEP.
3. A failure of the Active CCEP link (i.e., link 126) occurs while traffic is flowing.
4. CE device 118 detects the failure of link 126 and CE device 118 updates its LAG active port number to exclude the failed link; thus, incoming traffic is hashed to only active ports, even before the DRP goes down, resulting in faster convergence. Eventually, the DRP session between CE device 118 and PE device 104 will go down once the dead time expires, and the DRP will re-converge once SPF calculations are complete. Next hop will still remain valid, this will result in a "NO-OP" in the L3 routing table.
5. Traffic flows over link 124 based on the hashing on CE device 118.
6. The DRP session between CE device 118 and PE device 104 comes up again because DRP hello packets reach CE 118 via ICL 128.

The benefit of the DRP modification approach in this scenario is that the next hop address in the routing table of CE device 118 is the virtual IP address of cluster 122. Thus, if a LAG link goes down between CE device 118 and a cluster node, this will trigger DRP convergence, but the end result will be a NO-OP and removal or addition of active links in the LAG group. CE device 118 will immediately pick up the new active primary port in the LAG, and thus convergence will be faster than existing solutions.

2.1.2 Scenario 2: Standby CCEP Goes Down

In one embodiment, this scenario can proceed as follows:
1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this example, the port of PE device 104 connected to CE device 118 is carrying data traffic and is therefore the Active CCEP. The port of PE device 102 connected to CE device 118 is the Standby CCEP.
3. A failure of the Standby CCEP link (i.e., link 124) occurs while traffic is flowing through Active CCEP link 126.
4. CE device 118 detects the failure of the Standby CCEP link and the DRP session between CE device 118 and PE device 102 goes down; since there is no traffic over this link, no data is lost as the DRP converges; the Standby CCEP link is removed from the LAG group and if it was the primary LAG port, a new active primary LAG port is elected.
5. Traffic continues to flow via Active CCEP link 126.
6. The DRP session between CE device 118 and PE device 102 comes up again because DRP hello packets reach CE device 118 via ICL 128.
7. CE device 118 re-computes the best path for destination 110 given that the next hop is the virtual IP address of cluster 122; routing table is maintained intact and a new active link is added to the LAG group.

The benefit of the DRP modification approach in this scenario is that, even if the Standby CCEP link goes down, as long as one port in the LAG is up, DRP update of the best path will not cause a routing table update (i.e., NO-OP) because the next hop is the virtual IP address.

2.1.3 Scenario 3: ICL Goes Down

In one embodiment, this scenario can proceed as follows:
1. DRP sessions are established between devices 118 & 102 and devices 118 & 104.
2. Traffic to server 110 is forwarded from CE device 118 to PE device 104 and then on to PE device 106, which forwards the traffic to server 110 after L3 lookup. In this example, the port of PE device 104 connected to CE device 118 is carrying data traffic and is therefore the Active CCEP. The port of PE device 102 connected to CE device 118 is the Standby CCEP.
3. ICL 128 goes down.
4. Case A: If there is no alternative L2 connectivity between PE devices 102 and 104:
   a. PE devices 102 and 104 reprogram their respective Layer 2 forwarding tables to clear/disable the US flag for each entry.
   b. PE devices 102 and 104 each behave as an independent router and thus forward data traffic after L3 lookup.
   c. DRP adjacency between PE devices 102 and 104 over ICL 128 goes down once DRP "dead time" expires (e.g., 40 seconds in the case of OSPF).
5. Case B: If there is alternative L2 connectivity between PE devices 102 and 104:
   a. DRP hello packets between PE devices 102 and 104 flood over the alternative L2 link; thus, DRP adjacency does not go down.
   b. The US flag remains enabled in the forwarding tables for PE devices 102 and 104 since DRP adjacency does not go down.

2.1.4 Scenario 4: ICL Goes Down (Keepalive VLAN Provisioned)

This scenario may occur when ICL 128 goes down with a keepalive VLAN provisioned between PE devices 102 and 104. In one embodiment, this scenario can proceed as follows:
1. With the keepalive VLAN provisioned, election of master and slave nodes in cluster 122 occurs when ICL 128 goes down. The node with the lower Rbridge-ID becomes the master; the node with the higher Rbridge-ID becomes the slave and the slave brings down its corresponding CCEP ports.
2. The US flags in the forwarding tables of PE devices 102 and 104 are cleared/disabled.
3. DRP adjacency between CE device 118 and the slave node (e.g., PE device 104), as well as between PE devices 102 and 104, goes down.
4. Since DRP adjacency between CE device 118 and the slave node is lost, CE device 118 will only have one best path to the destination (through the master node);

the DRP will re-converge but next hop will remain intact (which is the virtual IP address of cluster 122).

2.1.5. Scenario 5: Uplink Port Goes Down

This scenario may occur when the uplink port (towards network core 116) on either PE device 102 or 104 goes down. In one embodiment, this scenario can proceed as follows:

1. Each cluster node (i.e., PE device 102/104) tracks the status of its uplink ports; in one embodiment, this can be a user-configurable option.
2. The US flag(s) in the L2 forwarding table of the cluster node is cleared if all of the ports on the node's track port list go down; if any port in the track port list remains up, the US flag is not cleared.
3. Users can be given the option to clear/disable the US flag based on a user-defined priority threshold; this is to avoid uplink oversubscription in cases where there are ECMP paths and where the customer has a concern that local forwarding should only remain intact if sufficient bandwidth on the uplink ports is conserved; the same applies if the uplink is a multi-slot LAG port.
4. Once the US flag is cleared on a given cluster node, incoming packets at that node which have a destination MAC address that does not match the node's interface MAC address will be L2 forwarded over ICL 128 to the other node; the other node will then perform a L3 lookup and forward the packets.

2.1.6. Scenario 6: Node Failure

This scenario may occur when a cluster node (i.e., PE device 102/104) goes down after being operational and actively carrying traffic. In one embodiment, this scenario can proceed as follows:

1. PE device 102 goes down.
2. The DRP session between CE device 118 and PE device 102, as well as between PE devices 102 and 104, also goes down.
3. The US flag on PE device 104 remains enabled; this implies that if a data packet is received at PE device 104 with a destination MAC address matching the interface MAC address of PE device 102, PE device 104 will attempt to L3 forward the packet (if a route exists).
4. CE device 118 performs SPF computation and re-computes all paths via PE device 104; since the virtual IP address is still active on PE device 104, no routing table update will occur, CE device 118 will only update the LAG active link.
5. All traffic from CE device 118 is hashed to PE device 104 and is forwarded based on the L3 lookup.

2.1.7. Scenario 7: MCT Node Comes Back Up

This scenario may occur when a cluster node (i.e., PE device 102/104) comes back up as part of, e.g., an operational SW/HW upgrade or reloaded by a network operator due to some unforeseen reason. In one embodiment, this scenario can proceed as follows:

1. Assume that the prior steps in scenario 6 have already occurred.
2. PE device 102 comes back up, which causes the LAG ports to be operational before the DRP re-converges; this can cause a race condition on CE device 118 in cases where the destination MAC address for a given data packet points to PE device 104 but the LAG hash results in the data packet being sent over link 124 to PE device 102; PE device 102 will not have a route to the destination, causing a traffic "black hole."
3. To avoid this race condition:
    a. The US flag in the L2 forwarding table of PE device 102 can be disabled.
    b. PE device 102 can install a default route to forward all traffic to PE device 104, with the assumption that PE device 104 will have an appropriate routing entry.
    c. Once DRP adjacency between CE device 118 and PE device 102 is back up, the US flag in the L2 forwarding table of PE device 102 can be re-enabled.

3. Exemplary Switch/Router

Figure 9:
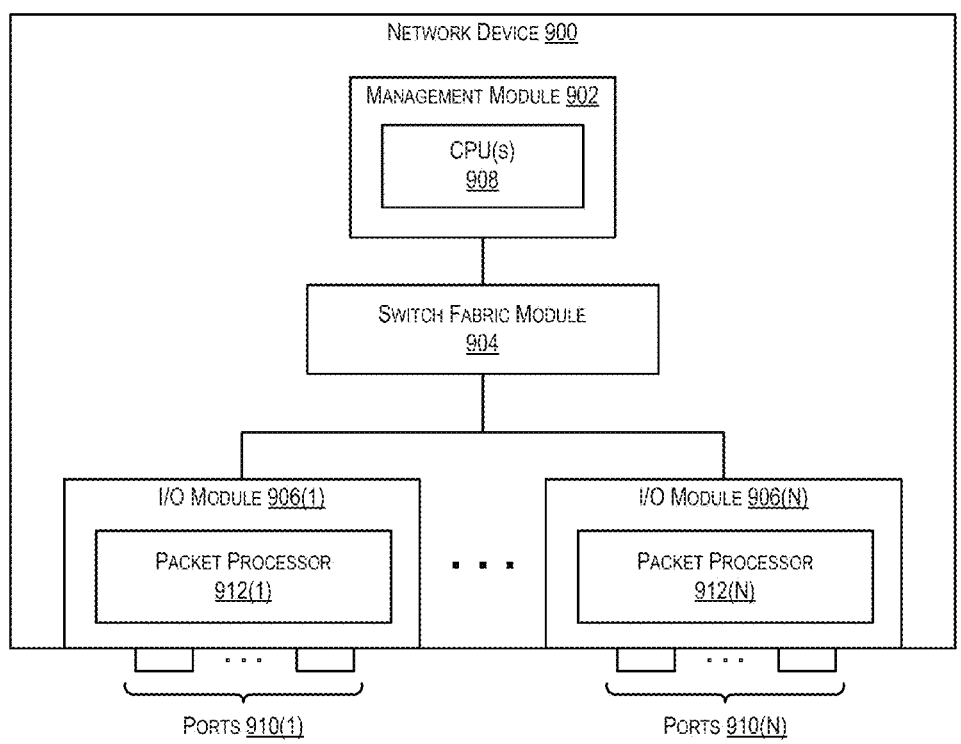
FIG. 9 depicts a network device according to an embodiment.

FIG. 9 depicts a simplified block diagram of an exemplary switch/router 900. In certain embodiments, switch/router 900 can be used to implement one or more of the network devices (e.g., 102-106, 118) described with respect to FIGS. 1A-1C, 2, 3, 5 and 6 above.

As shown, switch/router 900 includes a management module 902, a switch fabric module 904, and a number of I/O modules 906(1)-906(N). In a particular embodiment, each module can be implemented as a blade that is insertable into (and removable from) one of a plurality of modular slots in the chassis of switch/router 900. In this manner, switch/router 900 can be flexibly configured to accommodate different network topologies and switching requirements.

Management module 902 represents the control plane of switch/router 900 and thus includes one or more management CPUs 908 for managing/controlling the operation of the device. Each management CPU 908 can be a general purpose processor, such as a PowerPC, Intel, AMD, or ARM-based processor, that operates under the control of software stored in an associated memory (not shown). In one embodiment, CPU(s) 908 can perform the functions attributed to PE devices 102/104 in FIGS. 4A and 8A, and the functions attributed to CE device 118 in FIG. 8B.

Switch fabric module 904 and I/O modules 906(1)-906(N) collectively represent the data, or forwarding, plane of switch/router 900. Switch fabric module 904 is configured to interconnect the various other modules of switch/router 900. Each I/O module 906(1)-906(N) (also known as a line card) can include one or more input/output ports 910(1)-910(N) that are used by switch/router 900 to send and receive data packets. These ports can send and receive various types of data traffic at different speeds including 1 Gigabit per second, 10 Gigabits per second, 40 Gigabits per second, or 100 Gigabits per second. Each I/O module 906(1)-906(N) can also include a packet processor 912(1)-912(N). Packet processor 912(1)-912(N) is a hardware processing component (e.g., an FPGA or ASIC) that can make wire speed decisions on how to handle incoming or outgoing data packets. In one embodiment, each packet processor 912(1)-912(N) can perform the local routing functionality described with respect to FIGS. 4B and 8C above.

It should be appreciated that switch/router 900 is illustrative and not intended to limit embodiments of the present invention. Many other configurations having more or fewer components than switch/router 900 are possible.

4. Exemplary Computer System

Figure 10:
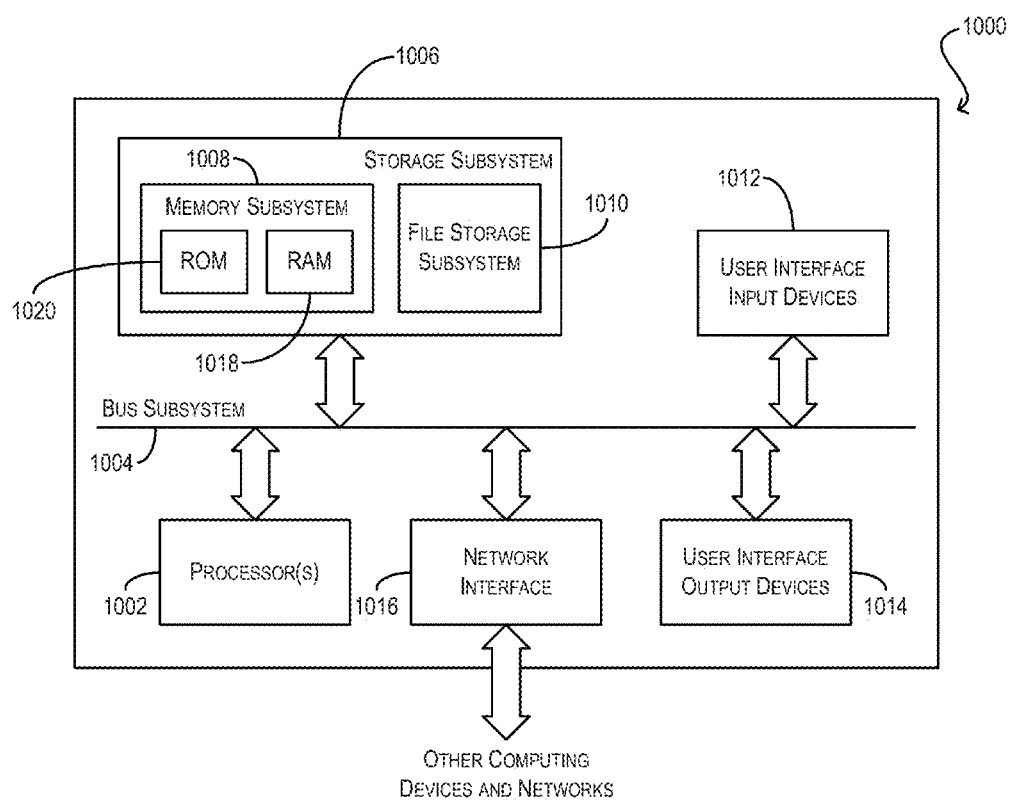
FIG. 10 depicts a computer system according to an embodiment.

FIG. 10 depicts a simplified block diagram of an exemplary computer system 1000. In certain embodiments, computer system 1000 can be used to implement one or more of the network devices (e.g., 102-106, 118) described with respect to FIGS. 1A-1C, 2, 3, 5 and 6 above (in the form of virtual network devices).

As shown in FIG. 10, computer system 1000 includes one or more processors 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computing devices or networks. Embodiments of network interface subsystem 1016 can include wired (e.g., coaxial, twisted pair, or fiber optic Ethernet) and/or wireless (e.g., Wi-Fi, cellular, Bluetooth, etc.) interfaces.

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 can include a memory subsystem 1008 and a file/disk storage subsystem 1010. Subsystems 1008 and 1010 represent non-transitory computer-readable storage media that can store program code and/or data that provide the functionality of various embodiments described herein.

Memory subsystem 1008 can include a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present invention. Many other configurations having more or fewer components than computer system 1000 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    determining, by a network device, that it is part of a system of network devices, the system of network devices acting as a virtual router;
    transmitting, by the network device to a client device, an OSI Layer 3 dynamic routing protocol (DRP) link state advertisement packet that includes
        an IP address of an interface of the network device,
        a virtual IP address of the virtual router, and
        a virtual MAC address of the virtual router;
    receiving, by the network device, a data packet from the client device, the data packet including the virtual MAC address of the virtual router as the data packet's destination MAC address;
    matching, by the network device, the destination MAC address of the data packet with an entry in a Layer 2 forwarding table;
    determining, by the network device, that a flag associated with the matched entry is enabled, the flag indicating that the matched entry specifies the virtual MAC address; and
    in response to the determining, performing, by the network device, a lookup into a layer 3 routing table and routing the data packet, in accordance with the lookup, to a next hop destination.

2. The method of claim 1 wherein the client device is connected to the system of network devices via a plurality of links that form a link aggregation group (LAG), and
    wherein the data packet is transmitted from the client device to the network device using one of the plurality of links in the LAG.

3. The method of claim 1 wherein the system of network devices interoperate using Virtual Router Redundancy Protocol (VRRP).

4. The method of claim 1 wherein the DRP link state advertisement packet is an Open Shortest Path First (OSPF) link state advertisement (LSA).

5. The method of claim 4 wherein the OSPF LSA is a Type 12 LSA.

6. The method of claim 1 wherein the dynamic routing protocol is an Intermediate System to Intermediate System (IS-IS) type-length-value (TLV) packet.

7. The method of claim 6 wherein the IS-IS TLV packet is a Type 128 TLV.

8. The method of claim 1 wherein the client device is a router or a switch.

9. The method of claim 1 further comprising:
    receiving, by the client device, the DRP link state advertisement packet from the network device;
    adding, by the client device, the IP address and the virtual IP address to a routing database;
    determining, by the client device, one or more routing entries for a Layer 3 routing table of the client device based on the routing database; and replacing, for each routing entry that identifies the IP address as a next hop IP address, the IP address with the virtual IP address.

10. The method of claim 9 wherein the system of network devices interoperate using Virtual Router Redundancy Protocol (VRRP).

11. The method of claim 9 where the DRP link state advertisement packet is an Open Shortest Path First (OSPF) link state advertisement (LSA).

12. The method of claim 9 wherein the DRP link state advertisement packet is an Intermediate System to Intermediate System (IS-IS) type-length-value (TLV) packet.

13. The method of claim 9 wherein the client device is connected to the system of network devices via a plurality of links that form a link aggregation group (LAG).

14. The method of claim 13 further comprising, by the client device:
 determining, based on the Layer 3 routing table of the client device, that a next hop IP address for a received data packet is the virtual IP address of the virtual router;
 calculating a hash value based on one or more headers of the data packet;
 selecting a link in the plurality of links based on the hash value; and
 forwarding the data packet over the selected link.

15. A network device comprising:
 a processor; and
 a non-transitory computer readable storage medium having stored thereon program code that, when executed by the processor, causes the processor to:
 determine that the network device is part of a system of network devices, the system of network devices acting as a virtual router;
 transmit, to a client device, an OSI Layer 3 dynamic routing protocol (DRP) link state advertisement packet that includes
  an IP address of an interface of the network device,
  a virtual IP address of the virtual router, and
  a virtual MAC address of the virtual router;
 receive a data packet from the client device, the data packet including the virtual MAC address of the virtual router as the data packet's destination MAC address;
 match the destination MAC address of the data packet with an entry in a Layer 2 forwarding table;
 determine that a flag associated with the matched entry is enabled, the flag indicating that the matched entry specifies the virtual MAC address; and
 in response to the determining, perform a lookup into a layer 3 routing table and route the data packet, in accordance with the lookup, to a next hop destination.

16. The network device of claim 15 wherein the client device is configured to:
 receive the DRP link state advertisement packet from the network device;
 add the IP address and the virtual IP address to a routing database; determine one or more routing entries for a Layer 3 routing table of the client device based on the routing database; and
 replace, for each routing entry that identifies the IP address as a next hop IP address, the IP address with the virtual IP address.

17. A non-transitory computer readable storage medium having stored thereon program code executable by a processor of a network device, the program code comprising:
 program code that causes the processor to determine that the network device is part of a system of network devices, the system of network devices acting as a virtual router;
 program code that causes the processor to transmit, to a client device, an OSI Layer 3 dynamic routing protocol (DRP) link state advertisement packet that includes
  an IP address of an interface of the network device,
  a virtual IP address of the virtual router, and
  a virtual MAC address of the virtual router;
 program code that causes the processor to receive a data packet from the client device, the data packet including the virtual MAC address of the virtual router as the data packet's destination MAC address;
 program code that causes the processor to match the destination MAC address of the data packet with an entry in a layer 2 forwarding table;
 program code that causes the processor to determine that a flag associated with the matched entry is enabled, the flag indicating that the matched entry specifies the virtual MAC address; and
 program code that causes the processor to, in response to the determining, perform a lookup into a layer 3 routing table and route the data packet, in accordance with the lookup, to a next hop destination.

18. The non-transitory computer readable storage medium of claim 17 wherein the client device is configured to:
 receive the DRP link state advertisement packet from the network device;
 add the IP address and the virtual IP address to a routing database;
 determine one or more routing entries for a Layer 3 routing table of the client device based on the routing database; and
 replace, for each routing entry that identifies the IP address as a next hop IP address, the IP address with the virtual IP address.

* * * * *